US012203810B2

(12) United States Patent
Fu et al.

(10) Patent No.: US 12,203,810 B2
(45) Date of Patent: Jan. 21, 2025

(54) SIMULATOR AND TEST METHOD OF POLARIZATION TRANSMISSION IN SEA FOG

(71) Applicant: CHANGCHUN UNIVERSITY OF SCIENCE AND TECHNOLOGY, Changchun (CN)

(72) Inventors: Qiang Fu, Changchun (CN); Jin Duan, Changchun (CN); Su Zhang, Changchun (CN); Juntong Zhan, Changchun (CN); Huilin Jiang, Changchun (CN); Guofang Xie, Changchun (CN); Huangying Gu, Changchun (CN); Yang Liu, Changchun (CN)

(73) Assignee: CHANGCHUN UNIVERSITY OF SCIENCE AND TECHNOLOGY, Changchun (CN)

( * ) Notice: Subject to any disclaimer, the term of this patent is extended or adjusted under 35 U.S.C. 154(b) by 268 days.

(21) Appl. No.: 17/895,178

(22) Filed: Aug. 25, 2022

(65) Prior Publication Data

US 2023/0133594 A1    May 4, 2023

(30) Foreign Application Priority Data

Aug. 26, 2021  (CN) .......................... 202110988336.3

(51) Int. Cl.
*G01J 4/04* (2006.01)
*G01J 4/00* (2006.01)
(Continued)

(52) U.S. Cl.
CPC .  *G01J 4/04* (2013.01); *G01J 4/00* (2013.01); *G01N 21/21* (2013.01); *G01N 21/278* (2013.01); *G01N 21/538* (2013.01); *Y02A 90/10* (2018.01)

(58) Field of Classification Search
CPC ... G01J 4/04; G01J 4/00; G01N 21/21; G01N 21/278; G01N 21/538; Y02A 90/10
See application file for complete search history.

(56) References Cited

U.S. PATENT DOCUMENTS

| 3,436,840 A | * | 4/1969 | Noxon ................... G06E 3/001 434/36 |
| 3,470,372 A | * | 9/1969 | Bayly .............. G01N 23/20066 250/336.1 |
| 2015/0276597 A1 | * | 10/2015 | Hamilton ............. G01N 21/538 239/14.1 |

FOREIGN PATENT DOCUMENTS

| CN | 107900723 A | * | 4/2018 | ............. B23B 39/00 |
| CN | 110108612 A | * | 8/2019 | ............. G01N 15/02 |
| CN | 111141390 A | * | 5/2020 | |

OTHER PUBLICATIONS

Fu, Qiang, et al. "Study of sea fog environment polarization transmission characteristics." Applied Sciences 12.17 (2022): 8892. (Year: 2022).*

(Continued)

*Primary Examiner* — Dominic J Bologna

(57) ABSTRACT

A simulator and test method of polarization transmission in sea fog belong to the technical field of polarization transmission characteristics. The simulator comprises an emitting device, a receiving device, a main box body, an automatic light alignment system, a water fog layer calibration system, a salt fog layer calibration system, and an aerosol layer calibration system. In accordance with the present disclosure, the automatic alignment of polarized light and a relatively stable sea fog environment are simulated in an indoor environment, the accuracy of indoor simulation is improved, the conformity between measured data and a (Continued)

theoretical simulation result is superior to 80%, and a reliable technical support is provided for the sea surface detection.

3 Claims, 1 Drawing Sheet

(51) Int. Cl.
    *G01N 21/21*     (2006.01)
    *G01N 21/27*     (2006.01)
    *G01N 21/53*     (2006.01)

(56)             References Cited

OTHER PUBLICATIONS

English Machine translation of CN111141390A (Year: 2020).*
English Machine translation of CN110108612A (Year: 2019).*
English Machine translation of CN107900723A (Year: 2017).*

* cited by examiner

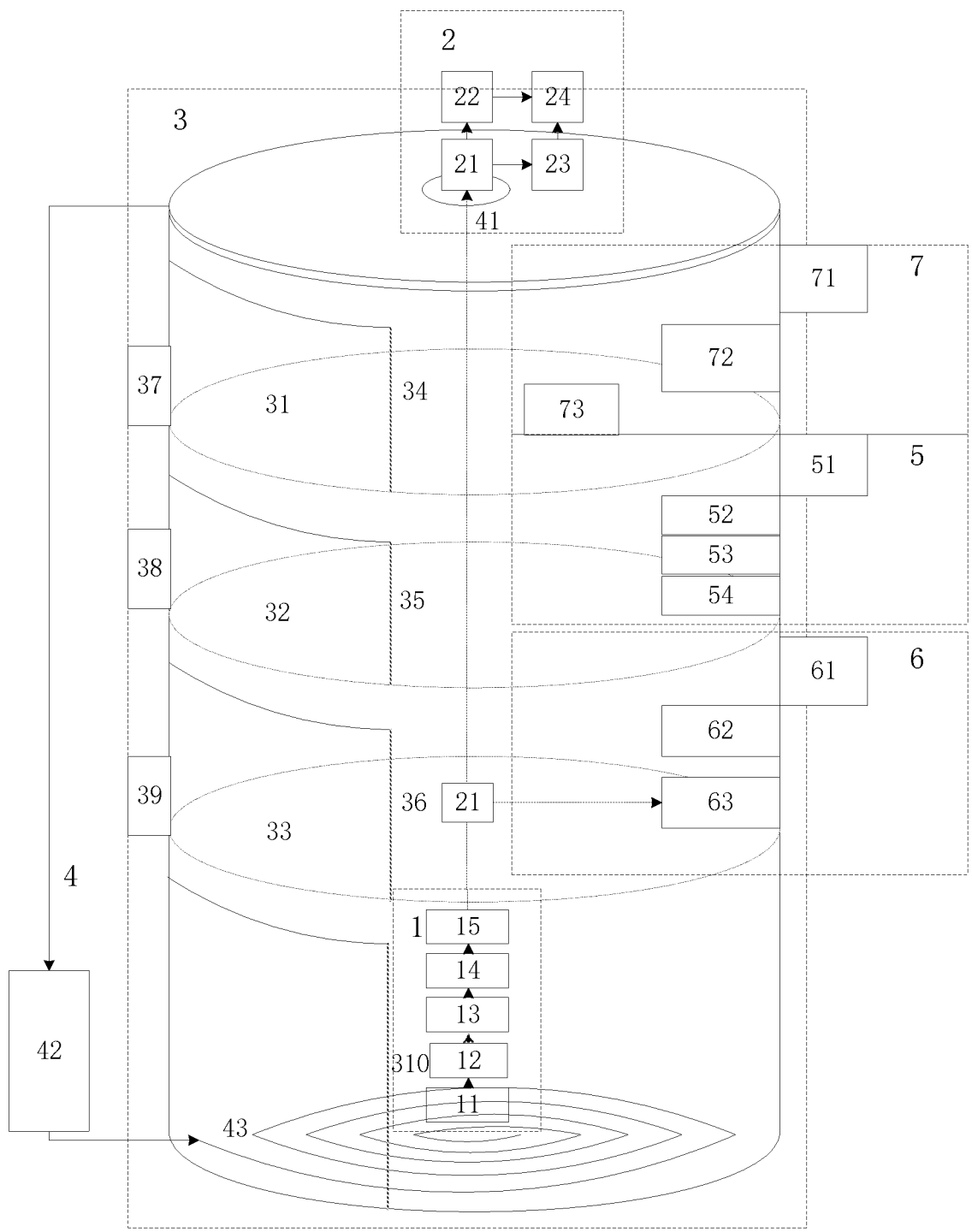

SIMULATOR AND TEST METHOD OF POLARIZATION TRANSMISSION IN SEA FOG

CROSS-REFERENCE TO RELATED APPLICATION

This patent application claims the benefit and priority of Chinese Patent Application No. 202110988336.3, filed with the China National Intellectual Property Administration on Aug. 26, 2021, the disclosure of which is incorporated by reference herein in its entirety as part of the present application.

TECHNICAL FIELD

The present disclosure belongs to the technical field of polarization transmission characteristics, and in particular relates to a simulator and test method of polarization transmission in sea fog.

BACKGROUND

In a case of sufficient water vapor, breeze and stable atmosphere, when the relative humidity reaches 100%, the water vapor in the air condenses to form tiny water droplets to suspend in the air, which makes the visibility of the sea surface level reduced. Such phenomenon is called sea fog. The sea fog severely affects the fields such as transportation, sea surface exploration and ocean development. Therefore, the need to study the sea fog environment is becoming more and more urgent.

With the development of modern optical technology, the application of optical detection in the marine environment is becoming increasingly widespread. However, outdoor detection is time-consuming and costly, the environment is complex and variable and not easy to detect at night. There are fewer indoor sea fog simulators, and the existing indoor sea fog simulator is unstable, fast in fog dissipation, and easy to cause large errors due to long equipment commissioning time, and has no mention of a calibration method for fog stable region.

Therefore, there is an urgent need for a novel technical solution in the prior art to solve this problem.

SUMMARY

The technical problem to be solved by the present disclosure is to provide a simulator and test method of polarization transmission in sea fog for solving the technical problems that an existing indoor sea fog simulator is unstable, fast in fog dissipation, large in error, and has no mention of a fog test method.

A simulator of polarization transmission in sea fog, comprising an emitting device, a receiving device, a main box body, an automatic light alignment system, a water fog layer calibration system, a salt fog layer calibration system, and an aerosol layer calibration system.

An aerosol layer lens spacer, a water fog layer lens spacer and a salt fog layer lens spacer are sequentially arranged in the main box body from top to bottom at intervals to divide the interior of the main box body into an aerosol layer, a water fog layer, a salt fog layer and an empty layer from top to bottom.

The automatic light alignment system comprises a semiconductor photosensitive plate, a first control device and a planar spiral track. The semiconductor photosensitive plate is arranged at the inner top of the main box body; the planar spiral track is arranged at the inner bottom of the main box body; and the first control device is electrically connected to the semiconductor photosensitive plate and the planar spiral track, respectively.

The emitting device is installed on the planar spiral track, and comprises a laser device, a liquid crystal light modulator SLM, an attenuation sheet, a polarizer and a $\lambda/4$ slide. The laser device, the liquid crystal light modulator SLM, the attenuation sheet, the polarizer and the $\lambda/4$ slide are sequentially arranged on the same optical axis.

The receiving device is arranged at the upper part of the main box body, and comprises a beam splitter prism, a polarimeter, an optical power meter and a computer. The beam splitter prism receives the light emitted from the emitting device and divides the incident light into two beams, one beam is transmitted to the polarimeter, and the other beam is transmitted to the optical power meter; and the computer is electrically connected to the polarimeter and the optical power meter, respectively;

The water fog layer calibration system comprises a water fog generator, a hygrometer, a thermometer, and a water vapor pressure tester. The water fog generator communicates with the water fog layer and is electrically connected to the computer; the hygrometer, the thermometer and the water vapor pressure tester are all fixedly installed in the water fog layer, and the hygrometer, the thermometer and the water vapor pressure tester are electrically connected to the computer, respectively.

The salt fog layer calibration system comprises a salt fog generator, a chloride ion absorber and a second optical power meter. The salt fog generator communicates with the salt fog layer and is electrically connected to the computer; the chloride ion absorber and the second optical power meter are fixedly installed in the salt fog layer, and the chloride ion absorber and the second optical power meter are electrically connected to the computer, respectively.

The aerosol layer calibration system comprises an aerosol generator, a visibility meter and a Malvern particle size analyzer. The aerosol generator communicates with the aerosol layer and is electrically connected to the computer; the visibility meter and the Malvern particle size analyzer are fixedly installed in the aerosol layer, and the visibility meter and the Malvern particle size analyzer are electrically connected to the computer, respectively.

The side walls of the aerosol layer, the water fog layer and the salt fog layer each are provided with an viewing window and an exhaust port.

A test method of the simulator of polarization transmission in sea fog comprises using the simulator of the polarization transmission in the sea fog, and comprises the following steps carried out in sequence:

step one, preparation of experimental environment calibrating the planar spiral track to a null position to ensure that interior of the main box body is in a fully dark dry environment;

step two, generation of simulated gas turning on a corresponding gas generator according to a sea fog environment to be simulated; filling, by the aerosol generator, atmospheric aerosol particles into an aerosol layer to serve as a transmission medium; filling, by the water fog generator, water fog particles into the water fog layer to serve as a transmission medium; and setting a media concentration of the salt fog generator, and then filling water fog particles with salt crystal particles as cores into the salt fog layer as a transmission medium;

step three, adjustment of emitting end turning on the emitting device, adjusting the laser device to emit the laser of a corresponding waveband, and enabling the laser to enter the liquid crystal light modulator SLM in parallel; attenuating, by the attenuation sheet, the outgoing laser of the liquid crystal light modulator SLM; changing, by the polarizer, the attenuated laser, into polarized light, and then changing, by the λ/4 slide, the polarized light into circular polarized light;

step four, alignment of light enabling the circular polarized light to reach the top layer of the main box body after passing through the three layers of simulated sea fog which comprises a salt fog layer, a water fog layer and an aerosol layer; if the light beam falls on the semiconductor photosensitive plate, regarding that the beam is not correctly received by the receiving device, switching on the semiconductor photosensitive plate to transmit a signal to the first control device; adjusting, by the first control device, a deflection direction of the planar spiral track, and then controlling the emitting device to rotate by a corresponding angle until no light beam enters the semiconductor photosensitive plate, thus regarding that the light beam is correctly received by the receiving device, and performing a step five;

step five, constant adjustment of fog layer setting, by a computer, a fog concentration value, and controlling the computer to drive the water fog generator to spray by means of real-time detection change values of the hygrometer, the thermometer and the water vapor pressure tester; controlling the computer to drive the salt fog generator to spray by means of real-time detection change values of the chloride ion absorber and the second optical power meter; and controlling the computer to drive the aerosol generator to spray by means of real-time detection change values of the visibility meter and the Malvern particle size analyzer;

stopping spraying if the real-time detection change values are all within a set threshold range, and waiting for one to two minutes to ensure that the fog is stable, and then performing a step six;

step six, adjustment of receiving device enabling the light beam received by the receiving device to enter the beam splitter prism which divides the light beam into two beams, wherein one beam enters a probe of the optical power meter for testing optical power on the optical power meter, and the other beam enters a probe of the polarimeter for receiving test values of the polarized light on the polarimeter; and recording, by the computer, the test values; and step seven, end of test turning off all devices, and opening exhaust ports of the aerosol layer, the water fog layer and the salt fog layer for emptying the box.

By means of the technical solution above, the present disclosure may bring the following beneficial effects:

In accordance with the present disclosure, the automatic alignment of polarized light and a relatively stable sea fog environment are simulated in an indoor environment, the accuracy of indoor simulation is improved, the conformity between measured data and a theoretical simulation result is superior to 80%, and thus a reliable technical support is provided for the sea surface detection.

BRIEF DESCRIPTION OF THE DRAWINGS

The present disclosure is further described below with reference to the accompanying drawings and specific embodiments.

FIG. 1 is a structure diagram of a simulator in a simulator device and test method of polarization transmission in sea fog in accordance with the present disclosure.

In the drawings: 1—emitting device; 2—receiving device; 3—main box body; 4—automatic light alignment system; 5—water fog layer calibration system; 6—salt fog layer calibration system; 7—aerosol layer calibration system; 11—laser device; 12—liquid crystal light modulator SLM; 13—attenuation sheet; 14—polarizer; 15—λ/4 slide; 21—bean splitter prism; 22—polarimeter; 23—first optical power meter; 24—computer; 31—aerosol layer lens spacer; 32—water fog layer lens spacer; 33—salt fog layer lens spacer; 34—first viewing window; 35—second viewing window; 36—third viewing window; 37—first exhaust port; 38—second exhaust port; 39—third exhaust port; 310—fourth viewing window; 41—semiconductor photosensitive plate; 42—first control device; 43—planar spiral track; 51—water fog generator; 52—hygrometer; 53—thermometer; 54—water vapor pressure tester; 61—salt fog generator; 62—chloride ion absorber; 63—second optical power meter; 71—aerosol generator; 72—visibility meter; 73—Malvern particle size analyzer.

DETAILED DESCRIPTION OF THE EMBODIMENTS

A simulator of polarization transmission in sea fog is as shown in FIG. 1, which comprises an emitting device 1, a receiving device 2, a main box body 3, an automatic light alignment system 4, a water fog layer calibration system 5, a salt fog layer calibration system 6, and an aerosol layer calibration system 7. An aerosol layer lens spacer 31, a water fog layer lens spacer 32 and a salt fog layer lens spacer 33 are sequentially arranged in the main box body 3 from top to bottom at intervals to divide the interior of the main box body 3 into an aerosol layer, a water fog layer, a salt fog layer and an empty layer from top to bottom. A side wall of the aerosol layer is provided with a first viewing window 34 and a first exhaust port 37. A side wall of the water fog layer is provided with a second viewing window 35 and a second exhaust port 38. A side wall of the salt fog layer is provided with a third viewing window 36 and a third exhaust port 39. A side wall of the empty layer is provided with a fourth viewing window 310. The first viewing window 34, the second viewing window 35, the third viewing window 36 and the fourth viewing window 310 are coaxially arranged. The first exhaust port 37, the second exhaust port 38 and the third exhaust port 39 are coaxially arranged. The emitting device 1 consists of a laser device 11, a liquid crystal light modulator SLM 12, an attenuation sheet 13, a polarizer 14 and a λ/4 slide 15, and is used for achieving the emitting of light beams. The emitting device 1 is arranged on a planar spiral track 43 in the empty layer of the main box body 3, a deflection direction of the planar spiral track 43 is adjusted, and then the emitting device 1 is controlled to rotate by a corresponding angle. The receiving device 2 consists of a beam splitter prism 21, a polarimeter 22, an optical power meter 23 and a computer 24, and may be used for achieving real-time test and data analysis. The receiving device 2 is arranged at the top of the main box body 3. The semiconductor photosensitive plate 41 is arranged at the inner surface of the top of the main box body 3 and is connected to the first control device 42, and then the first control device 42 is connected to the planar spiral track 43 to control the alignment of an upper light beam, thereby achieving the automatic alignment of the light. A water fog generator 51, a hygrometer 52, a thermometer 53 and a water vapor pressure tester 54 are perpendicularly placed on the side wall of the main box body 3 for the calibration of the water fog layer. A salt fog generator 61, a chloride ion absorber 62 and a second optical power meter 63 are perpendicularly located on the side wall of the main box body 3 for the calibration of the salt fog layer. An aerosol generator 71 is located on the side wall of the main box body 3, and a visibility meter 72 and a Malvern particle size analyzer are horizontally placed on the salt fog layer lens spacer 33, thereby the calibration of the aerosol layer.

Specifically, the laser device 11 employs a dye tunable laser device produced by C.F. Technology (Beijing) Co., Ltd., the liquid crystal light modulator SLM 12 is a liquid crystal light modulator produced by Beijing Wave Optics Co., Ltd., the attenuation sheet 13 employs an attenuation sheet produced by Shenzhen Giai Photonics Co., Ltd., the polarizer 14 employs a polarizer produced by the Beijing Yongxing Sensing Instrument Co., Ltd., the λ/4 slide employs a ¼ slide produced by Fuzhou MT-Optics, Inc., the beam splitter prism 21 employs a prism produced by USA THORLABS Inc., the polarimeter 22 employs the polarization state tester produced by Chengdu Optorunning Technology Co., Ltd., and the optical power meter 23 employs a digital handheld optical power meter produced by USA THORLABS Inc.

An operation process of the present disclosure is as follows:

Step One, Preparation of Experimental Environment

An emitting device 1 and a receiving device 2 are detected, various experimental apparatuses are fixed onto an optical platform, a planar spiral track 43 is calibrated to a null position to guarantee the dark dry environment in a main box body 3, thus the ambient light is prevented from affecting the laser, and the required experimental conditions are satisfied.

Step Two, Generation of Simulated Gas

A corresponding gas generator is turned on according to a sea fog environment to be simulated. An aerosol generator 71 is turned on to fill atmospheric aerosol particles into an aerosol layer to serve as a transmission medium; a water fog generator 51 is turned on to fill water fog particles into a water fog layer to serve as a transmission medium; a media concentration of the salt fog generator 61 is set, and then water fog particles with salt crystal particles as the core are filled into the salt fog layer to serve as a transmission medium.

Step Three, Adjustment of Emitting End

The emitting device 1 is turned on, the laser device 11 is adjusted to emit laser of a corresponding waveband, the laser enters a liquid crystal light modulator SLM 12 in parallel, and the outgoing laser is sequentially attenuated by an attenuation sheet 13 and then is changed into polarized light by a polarizer 14, and then the polarized light is changed into circularly polarized light by a λ/4 slide 15;

Step Four, Alignment of Light

The light reaches the top layer of the main box body 3 after passing through three layers of simulated sea fog, if the light is not correctly received by a receiving end, the light beam falls on a semiconductor photosensitive plate 41, the semiconductor photosensitive plate is switched on to transmit a signal to a first control device 42, and the first control device 42 is configured to adjust the deflection direction of the planar spiral track 43 by means of the received signal, and then the emitting device 2 is controlled to rotate by a corresponding angle until no light beam enters the photosensitive board 41, and thus the light beam is correctly received by the receiving device 2.

Step Five, Calibration Method of Stable Region

A calibration method of a stable region comprises performing calibration by using a laser beam. The calibration method of the stable region of the water fog layer of the device comprises determining a concentration change of the fog by means of a difference between the temperature and humidity. The humidity is measured by using a hygrometer 52, the temperature is measured by using a thermometer, and then a difference value is calculated. If the difference value is stable, it is determined that the water fog concentration is stable. If the difference value varies greatly, it is determined that the water fog concentration is unstable.

The relative humidity f is known as the percentage of actual atmospheric vapor pressure (p1) and saturated vapor pressure (p2) at the same temperature, that is, $$f = \frac{p_1}{p_2} \times 100\%$$

In order to simplify the calculation, the percent sign is omitted, and the relative humidity f is subjected to differential calculation to obtain $$\frac{df}{f} = \frac{dp_1}{p_1} - \frac{dp_2}{p_2}$$

The following may be obtained according to the Clapeyron equation and the ideal gas equation of state:

$$p_1 m = \rho_1 RT$$

$$\frac{df}{f} = \frac{d\rho_1}{\rho_1} - \frac{L}{nRT} * \frac{dT}{T}$$

It is known that in the standard case, $\rho_1$ is actual water vapor density, R is a molar gas constant, L is latent heat of phase change, m is a molar mass of water vapor, T=273.15 K, n=1 mol, and L/nRT is a constant, so the change in water vapor content and the change in temperature (dT) may cause the change in fog concentration (df): the increase of water vapor and the reduction of the temperature may increase the relative humidity of air (df>0), such that the original fog which is not too dense becomes more dense, and vice versa, the original dense fog may become light or even dissipate. Therefore, it can be proved that determining the concentration change of the fog by using the difference value between the humidity and the temperature is an effective method.

In accordance with the device, the salt fog layer is calibrated by using a method of combining optical power and chloride ion concentration, the optical power of the laser is attenuated after the laser passes through the salt fog layer. When the fog is stable, the optical power fluctuates within a relatively stable range, and meanwhile, chloride ions in the salt fog layer are detected, and then calibration is carried out according to a salt fog concentration formula, $$S_c = k \frac{[Cl^-] \times V}{Q \times t}$$

where $S_c$ is the content of salt fog, the [Cl-] is a chloride ion concentration, Q is a flow rate of sampling inspiration, V is a total volume of absorption liquid, and t is sampling time. Whether a reading of the second optical power meter 63 stably fluctuates within a certain range or not is checked, then the chloride ions in the salt fog layer are collected by the chloride ion absorber 62, and the salt fog concentration is calculated according to the salt fog concentration formula so as to calibrate the salt fog layer.

In accordance with the device, the aerosol layer is calibrated in a mode of combining a Malvern particle size analyzer 73 with a visibility meter 72, and then a particle concentration is measured. By providing an empty box control group, the visibility range is measured when no aerosol particles are filled, the visibility range is measured when the aerosol is saturated, and a particle size distribution when the aerosol is saturated is measured by using the Malvern particle analyzer 73.

Step Six, Adjustment of Receiving End

A light beam received by the receiving device 2 enters a beam splitter prism 21 which divides the light beam into two beams, one beam enters a probe of the optical power meter 23 for testing the optical power on an optical power meter 23, and the other beam enters a probe of the polarimeter 22 for receiving test values of the polarized light on a polarimeter 22, and a computer 24 is connected to record the values for analysis.

Step Seven, End of Test

The devices are turned off, the first exhaust port 37, the second exhaust port 38 and the third exhaust port 39 are opened to empty the box.

The above is only preferred specific modes of the present disclosure, but the scope of protection of the present disclosure is not limited thereto, variations or substitutions, which can be easily thought of within the technical scope disclosed by embodiments of the present disclosure by any person skilled in the art, should fall within the scope of protection of the present disclosure.

What is claimed is:

1. A simulator of polarization transmission in sea fog, comprising an emitting device (1), a receiving device (2), a main box body (3), an automatic light alignment system (4), a water fog layer calibration system (5), a salt fog layer calibration system (6), and an aerosol layer calibration system (7);

an aerosol layer lens spacer (31), a water fog layer lens spacer (32) and a salt fog layer lens spacer (33) are sequentially arranged in the main box body (3) from top to bottom at intervals to divide the interior of the main box body (3) into an aerosol layer, a water fog layer, a salt fog layer and an empty layer from top to bottom;

the automatic light alignment system (4) comprises a semiconductor photosensitive plate (41), a first control device (42) and a planar spiral track (43); the semiconductor photosensitive plate (41) is arranged at the inner top of the main box body (3); the planar spiral track (43) is arranged at the inner bottom of the main box body (3); the first control device (42) is electrically connected to the semiconductor photosensitive plate (41) and the planar spiral track (43), respectively;

the emitting device (1) is installed on the planar spiral track (43), and comprises a laser device (11), a liquid crystal light modulator SLM (12), an attenuation sheet (13), a polarizer (14) and a λ/4 slide (15); the laser device (11), the liquid crystal light modulator SLM (12), the attenuation sheet (13), the polarizer (14) and the λ/4 slide (15) are sequentially arranged on the same optical axis;

the receiving device (2) is arranged at the upper part of the main box body (3), and comprises a beam splitter prism (21), a polarimeter (22), an optical power meter (23) and a computer (24); the beam splitter prism (21) receives the light emitted from the emitting device (1) and divides the incident light into two beams, one beam is transmitted to the polarimeter (22), and another beam is transmitted to the optical power meter (23); the computer (24) is electrically connected to the polarimeter (22) and the optical power meter (23), respectively;

the water fog layer calibration system (5) comprises a water fog generator (51), a hygrometer (52), a thermometer (53), and a water vapor pressure tester (54); the water fog generator (51) communicates with the water fog layer and is electrically connected to the computer (24); the hygrometer (52), the thermometer (53) and the water vapor pressure tester (54) are all fixedly installed in the water fog layer, and the hygrometer (52), the thermometer (53) and the water vapor pressure tester (54) are electrically connected to the computer (24), respectively;

the salt fog layer calibration system (6) comprises a salt fog generator (61), a chloride ion absorber (62) and a second optical power meter (63); the salt fog generator (61) communicates with the salt fog layer and is electrically connected to the computer (24); the chloride ion absorber (62) and the second optical power meter (63) are fixedly installed in the salt fog layer, and the chloride ion absorber (62) and the second optical power meter (63) are electrically connected to the computer (24), respectively;

the aerosol layer calibration system (7) comprises an aerosol generator (71), a visibility meter (72) and a particle size analyzer (73); the aerosol generator (71) communicates with the aerosol layer and is electrically connected to the computer (24); the visibility meter (72) and the particle size analyzer (73) are fixedly installed in the aerosol layer, and the visibility meter (72) and the particle size analyzer (73) are electrically connected to the computer (24), respectively.

2. The simulator of polarization transmission in sea fog according to claim 1, wherein side walls of the aerosol layer, the water fog layer and the salt fog layer each are provided with a viewing window and an exhaust port.

3. A test method of the simulator of polarization transmission in sea fog, which comprises using the simulator of polarization transmission in sea fog according to claim 1, wherein the method comprises the following steps carried out in sequence:

step one, preparation of experimental environment calibrating the planar spiral track (43) to a null position to ensure that interior of the main box body (3) is in a fully dark dry environment;

step two, generation of simulated gas turning on a corresponding gas generator according to a sea fog environment to be simulated; filling, by the aerosol generator (71), atmospheric aerosol particles into an aerosol layer to serve as a transmission medium; filling, by the water fog generator (51), water fog particles into the water fog layer to serve as a transmission medium; and setting a media concentration of the salt fog generator (61), and then filling water fog particles with salt crystal particles as cores into the salt fog layer as a transmission medium;

step three, adjustment of emitting end turning on the emitting device (1), adjusting the laser device (11) to emit the laser of a corresponding waveband, and enabling the laser to enter the liquid crystal light modulator SLM (12) in parallel; attenuating, by the attenuation sheet (13), the outgoing laser of the liquid crystal light modulator SLM (12); changing, by the polarizer (14), the attenuated laser, into polarized light, and then changing, by the λ/4 slide (15), the polarized light into circular polarized light;

step four, alignment of light enabling the circular polarized light to reach the top layer of the main box body (3) after passing through the three layers of simulated sea fog which comprises a salt fog layer, a water fog layer and an aerosol layer; if the light beam falls on the semiconductor photosensitive plate (41), regarding that the beam is not correctly received by the receiving device (2), switching on the semiconductor photosensitive plate (41) to transmit a signal to the first control device (42); adjusting, by the first control device (42), a deflection direction of the planar spiral track (43), and then controlling the emitting device to rotate by a corresponding angle until no light beam enters the semiconductor photosensitive plate (41), thus regarding that the light beam is correctly received by the receiving device (2), and performing a step five;

step five, constant adjustment of fog layer setting, by a computer (24), a fog concentration value, and controlling the computer (24) to drive the water fog generator (51) to spray by means of real-time detection change values of the hygrometer (52), the thermometer (53) and the water vapor pressure tester (54); controlling the computer (24) to drive the salt fog generator (61) to spray by means of real-time detection change values of the chloride ion absorber (62) and the second optical power meter (63); and controlling the computer (24) to drive the aerosol generator (71) to spray by means of real-time detection change values of the visibility meter (72) and the particle size analyzer (73);

stopping spraying if the real-time detection change values are all within a set threshold range, and waiting for one to two minutes to ensure that the fog is stable, and then performing a step six;

step six, adjustment of receiving device (2)

enabling a light beam received by the receiving device (2) to enter the beam splitter prism (21) which divides the light beam into two beams, wherein one beam enters a probe of the optical power meter (23) for testing optical power on the optical power meter (23), and the other beam enters a probe of the polarimeter (22) for receiving test values of the polarized light on the polarimeter (22); and recording, by the computer (24), the test values; and step seven, end of test turning off all devices, and opening exhaust ports of the aerosol layer, the water fog layer and the salt fog layer for emptying the box.

\* \* \* \* \*